(12) United States Patent
Gillessen et al.

(10) Patent No.: US 12,405,169 B2
(45) Date of Patent: Sep. 2, 2025

(54) VEHICLE PANE WITH INTEGRATED TEMPERATURE SENSOR

(71) Applicant: SAINT-GOBAIN GLASS FRANCE, Courbevoie (FR)

(72) Inventors: Stephan Gillessen, Alsdorf (DE); Robert Besler, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 520 days.

(21) Appl. No.: 17/799,212

(22) PCT Filed: Jan. 20, 2021

(86) PCT No.: PCT/EP2021/051138
§ 371 (c)(1),
(2) Date: Aug. 11, 2022

(87) PCT Pub. No.: WO2021/160388
PCT Pub. Date: Aug. 19, 2021

(65) Prior Publication Data
US 2023/0073820 A1    Mar. 9, 2023

(30) Foreign Application Priority Data
Feb. 12, 2020   (EP) ...................................... 20156850

(51) Int. Cl.
*G01K 1/14* (2021.01)
*B32B 17/10* (2006.01)
(Continued)

(52) U.S. Cl.
CPC .......... *G01K 1/14* (2013.01); *B32B 17/10036* (2013.01); *B32B 17/1022* (2013.01);
(Continued)

(58) Field of Classification Search
CPC ........... G01K 1/14; G01K 1/143; G01K 7/16; G01K 2007/163; B23B 17/10036;
(Continued)

(56) References Cited

U.S. PATENT DOCUMENTS 2,806,118 A    9/1957 Peterson
5,213,828 A  *  5/1993 Winter .............. B32B 17/10761
                                                            428/209
(Continued)

FOREIGN PATENT DOCUMENTS

CN    101939164 A    1/2011
CN    102187733 A    9/2011
(Continued)

OTHER PUBLICATIONS

International Search Report as issued in International Patent Application No. PCT/EP2021/051138, dated Apr. 26, 2021.
(Continued)

*Primary Examiner* — Mirellys Jagan
(74) *Attorney, Agent, or Firm* — Pillsbury Winthrop Shaw Pittman LLP

(57) ABSTRACT

A vehicle pane with a temperature sensor, includes a substrate and a transparent, electrically conductive coating on a surface of the substrate, wherein a temperature measuring field that is electrically isolated from the surrounding electrically conductive coating by a separating line is formed in the electrically conductive coating, a measurement current path running between two electrical contact points is formed from a region of the electrically conductive coating in the temperature measuring field, the electrical contact points can be connected to a voltage source such that an electric current flows through the measurement current path, and the electrical contact points can be connected to an analysis unit that is suitable for measuring the current strength of the electric
(Continued)

current, determining the electrical resistance of the measurement current path therefrom, and determining the temperature from the electrical resistance using calibration data.

20 Claims, 3 Drawing Sheets

(51) Int. Cl.
*B60J 1/00* (2006.01)
*G01K 7/16* (2006.01)

(52) U.S. Cl.
CPC ............. *B32B 17/1055* (2013.01); *B60J 1/00* (2013.01); *G01K 7/16* (2013.01); *B32B 2264/1051* (2020.08); *B32B 2307/202* (2013.01); *B32B 2307/302* (2013.01); *B32B 2307/304* (2013.01); *B32B 2307/412* (2013.01); *B32B 2605/006* (2013.01); *G01K 2007/163* (2013.01)

(58) Field of Classification Search
CPC .......... B23B 17/1055; B23B 17/10005; B23B 17/10174; B23B 2264/1051; B23B 2307/202; B23B 2307/302; B23B 2307/304; B23B 2307/412; B23B 2605/006; B60J 1/00
See application file for complete search history.

(56) References Cited

U.S. PATENT DOCUMENTS

| | | | |
|---|---|---|---|
| 2007/0020465 A1 | 1/2007 | Thiel et al. | |
| 2007/0044542 A1* | 3/2007 | Barguirdjian | B32B 17/10036 73/73 |
| 2007/0082219 A1 | 4/2007 | Fleury et al. | |
| 2009/0044464 A1 | 2/2009 | Schmidt et al. | |
| 2010/0163675 A1* | 7/2010 | Rashid | B64C 1/1484 73/75 |
| 2011/0266275 A1 | 11/2011 | Rateiczak | |
| 2015/0334779 A1 | 11/2015 | Phan et al. | |

FOREIGN PATENT DOCUMENTS

| | | | | |
|---|---|---|---|---|
| CN | 102271995 A | 12/2011 | | |
| CN | 102960053 A | 3/2013 | | |
| CN | 103202095 A | 7/2013 | | |
| CN | 104025704 A | 9/2014 | | |
| CN | 109890089 A | 6/2019 | | |
| DE | 102022206014 A1 * | 12/2023 | | |
| EP | 2 141 135 A1 | 1/2010 | | |
| EP | 2 586 610 B1 | 5/2014 | | |
| EP | 2 335 452 B1 | 2/2016 | | |
| EP | 2 591 638 B1 | 10/2016 | | |
| EP | 2 890 655 B1 | 3/2019 | | |
| EP | 2 906 417 B1 | 8/2019 | | |
| JP | 2014-502408 A | 1/2014 | | |
| JP | 2015-507600 A | 3/2015 | | |
| WO | WO 03/024155 A2 | 3/2003 | | |
| WO | WO-2006008518 A1 * | 1/2006 | ....... | B32B 17/10009 |
| WO | WO 2010/115558 A1 | 10/2010 | | |
| WO | WO 2011/105991 A1 | 9/2011 | | |
| WO | WO 2012/066112 A1 | 5/2012 | | |
| WO | WO 2013/104438 A1 | 7/2013 | | |
| WO | WO 2013/104439 A1 | 7/2013 | | |
| WO | WO 2014/095152 A1 | 6/2014 | | |
| WO | WO 2018/206236 A1 | 11/2018 | | |

OTHER PUBLICATIONS

Notice of Reasons for Rejection as issued in Japanese Patent Application No. 2022-548752, dated Dec. 5, 2023.
Search Report as issued in Chinese Patent Application No. 202180000499.4, Jan. 20, 2023.

* cited by examiner

VEHICLE PANE WITH INTEGRATED TEMPERATURE SENSOR

CROSS-REFERENCE TO RELATED APPLICATIONS

This application is the U.S. National Stage of PCT/EP2021/051138, filed Jan. 20, 2021, which in turn claims priority to European patent application number 20 156 850.8 filed Feb. 12, 2020. The content of these applications are incorporated herein by reference in their entireties.

FIELD

The invention relates to a vehicle pane with a temperature sensor, a vehicle equipped therewith, a method for measuring its temperature, and use thereof.

BACKGROUND

It is common to measure the temperature of the interior of a vehicle with temperature sensors situated in this interior. The temperature thus measured can be used, for example, to control an air conditioning system and to regulate the temperature to a target temperature specified by the driver.

In principle, the temperature can also be used to control heating of the vehicle pane itself, for example, by integrated heating means or by an airflow directed at the vehicle pane. For example, the pane can be automatically defrosted when the temperature is below freezing. However, this procedure is not optimal since the temperature. In the interior does not correspond exactly to the temperature of the pane. It would also be possible to measure the temperature of the pane using temperature sensors attached thereto. However, sensors that must be installed after production increase the manufacturing cost of the vehicle, increase the space requirement, and are sometimes prone to errors.

It is known per se to equip vehicle panes with electrically conductive coatings. Such coatings can be used, for example, to improve thermal comfort in the interior. The coatings, as so-called IR protective coatings, can reflect infrared components of sunlight or, as so-called emissivity reducing coatings (low-E coatings), can prevent thermal radiation from the vehicle pane itself into the interior. When a current flows through the coatings, they can be used to heat the vehicle pane. Such coatings are well known from a large number of publications. Merely by way of example, reference is made to WO03/024155, US20070082219A1, US20070020465A1, WO2013104438, or WO2013104439, which disclose silver-based IR protective coatings or heatable coatings, and to EP2141135A1, WO2010115558A1, WO2011105991A1, and WO2018206236A1, which disclose emissivity reducing coatings based on transparent conductive oxides.

It is also known to pattern transparent conductive coatings using laser decoating. In this process, thin, linear decoated regions are introduced into the coating with a laser. These have been used, for example, to provide the coated pane with transmittance for electromagnetic radiation in order, for example, to be able to receive mobile phone or GPS signals in the vehicle interior, or to conduct a current flow, in order, for example, to avoid local hot spots. Merely by way of example, reference is made to EP2591638B1, EP2335452B1, EP2586610B1, EP2890655B1, WO2014095152A1, and EP2906417B1.

SUMMARY

The object of the present invention is to provide a vehicle pane having an integrated temperature sensor and a method for measuring the temperature of such a vehicle pane.

The object of the present invention is accomplished according to the invention by a vehicle pane according to claim 1. Preferred embodiments emerge from the dependent claims.

The temperature sensor is integrated directly into the vehicle pane such that subsequent attachment of an external sensor becomes unnecessary. The temperature sensor enables measurement of the true pane temperature. It is implemented on a transparent coating and is thus visually inconspicuous. These are major advantages of the present invention.

The vehicle pane according to the invention with a temperature sensor comprises at least a substrate and a transparent, electrically conductive coating on a surface of the substrate. The term "transparent coating" means a coating that has average transmittance in the visible spectral range of at least 70%, preferably at least 80%, particularly preferably at least 90%, and, as a result, does not substantially restrict vision through the pane.

The substrate is preferably a glass pane, in particular made of soda lime glass, as is customary for vehicle panes. However, the substrate can also be made of other types of glass, for example, aluminosilicate glass, borosilicate glass, or quartz glass or even of transparent plastics, for example, polycarbonate (PC) or polymethyl methacrylate (PMMA). The thickness of the substrate is usually from 0.5 mm to 5 mm.

In preferred embodiments, the vehicle pane is implemented as single-pane safety glass (ESG) or as laminated safety glass (VSG). Structurally, single-pane safety glass is formed only by the glass substrate, which is thermally prestressed. In the case of laminated safety glass, the substrate is bonded to another pane via a thermoplastic intermediate layer. The substrate can be either the inner pane, which is intended to face the vehicle interior in the installed position, or the outer pane, which is intended to face the external environment in the installed position. The other pane is preferably also a glass pane, in particular made of soda lime glass. However, the other pane can also be made of other types of glass, for example, aluminosilicate glass, borosilicate glass, or quartz glass, or even of transparent plastics, for example, PC or PMMA. In the case of laminated safety glass, the thicknesses of the substrate and the other pane are usually from 0.5 mm to 3 mm.

In the case of single-pane safety glass, the electrically conductive coating is preferably arranged on the interior-side surface of the substrate. This refers to the surface facing the interior in the installed position. In the case of laminated safety glass in which the substrate forms the outer pane, the coating is preferably arranged on the interior-side surface of the substrate, which faces the intermediate layer and the inner pane. In the interior of the laminated glass, the electrically conductive coating is then protected against corrosion and damage. In the case of laminated safety glass in which the substrate forms the inner pane, the coating is preferably arranged on the exterior-side surface of the substrate, which faces the intermediate layer and the outer pane, with it being protected against corrosion and damage in the interior of the laminated glass. Alternatively, the coating is preferably arranged on the interior-side surface of the substrate as an inner pane.

There are, in principle, no requirements for the coating so long as it is electrically conductive. Customary coatings are stacks of multiple thin layers, with the electrical conductivity provided by one or more electrically conductive individual layers. The layer thicknesses of the individual layers of the thin layer stack are usually less than 1 μm. If the coating is applied to an exposed surface of the substrate, for example, the interior-side surface in the case of single-pane safety glass or laminated safety glass with the substrate as the inner pane, the coating should be corrosion resistant. Each electrically conductive layer is preferably formed based on a transparent conductive oxide (TCO), in particular based on indium tin oxide (ITO), alternatively, for example, based on mixed indium zinc oxide (IZO), gallium-doped tin oxide (GZO) [sic], fluorine-doped tin oxide ($SnO_2$:F), or antimony-doped tin oxide ($SnO_2$:Sb). Such coatings are, in particular, common as emissivity-reducing coatings (low-E coatings), in which case, on the interior-side surface of the vehicle pane, they reduce the emission of thermal radiation of the pane into the interior and the radiation of heat from the interior outward. If the coating is arranged on an internal surface of a laminated pane, for example, the interior-side surface of a substrate as the outer pane of a VSG or the exterior-side surface of a substrate as the inner pane of a VSG, even corrosion-susceptible conductive layers can be used. Each electrically conductive layer is preferably based on a metal, in particular based on silver, alternatively, for example, based on gold, aluminum, or copper. Such coatings are, in particular, common as IR protective coatings and/or heatable coatings in laminated panes, with infrared radiation components of sunlight being reflected and/or electrically contacted such that an electric current can be conducted through them to heat the vehicle pane. The electrical connection is typically made via bus bars that are arranged along two opposite side edges over most of the width of the pane and are implemented, for example, as strips of a metal foil, in particular copper foil, or as baked paste containing glass frits and silver particles, usually screen-printed on.

In a preferred embodiment, the conductive coating has linear or approx. linear temperature dependence of the electrical resistance in the temperature range from −30° C. to 50° C. This is advantageous in terms of exact calibration of the temperature sensor.

The temperature sensor is formed by a region of the electrically conductive coating. For this purpose, a temperature measuring field is formed in the electrically conductive coating. The temperature measuring field is completely electrically isolated from the surrounding electrically conductive coating by a coating-free separating line. The temperature sensor is arranged within the temperature measuring field. The separating line electrically decouples the temperature sensor from the conductive coating outside the temperature measuring field. In a preferred embodiment, the temperature measuring field is completely surrounded by the conductive coating. The separating line describes a self-contained shape, for example, a rectangle or other type of polygon or a circle or other type of oval. In principle, it is also possible to form the temperature measuring field at the edge of the conductive coating such that it is only partially surrounded by the rest of the coating. The separating line then runs between two points on the side edge of the conductive coating.

The shape and size of the temperature measuring field can be freely selected. However, it is advisable to design the temperature measuring field as small as possible to ensure that the temperature sensor is visually inconspicuous. In an advantageous embodiment, the temperature measuring field has a size of at most 5 $cm^2$, preferably from 0.5 $cm^2$ to 2 $cm^2$.

The temperature sensor itself is formed from two electrical contact points and a measurement current path running between them. The electrical contact points are used for electrical contacting of the temperature sensor, i.e., for the electrical connection to the voltage source and the analysis unit. The contact points are preferably implemented as printed and baked electrically conductive paste that contains glass frits and silver particles. The printing is usually carried out by screen printing. The contact points are connected to electrical cables or are intended to be connected to electrical cables, via which the electrical connection to the voltage source and the analysis unit is established. If the electrically conductive coating and the electrical contact points are arranged inside a laminated pane, flat conductors in particular are used as electrical cables. These contain an electrically conductive core that is typically designed as a strip of a metal foil, in particular, copper foil, in an electrically insulating polymeric sheath. If the electrically conductive coating and the electrical contact points are arranged on an exposed surface of the vehicle pane, flat conductors can also be used for contacting; or rigid, solid connection elements can be attached at the contact points, which are, in turn, connected to the electrical cable by soldering, welding, crimping, or as a plug connection. The electrical cables connected to the solid connection elements are usually stranded conductors, round conductors, or ribbon-like metal mesh. The connection of the flat conductor or of the solid connection element to the electrical contact points is preferably done by means of a soldering compound. Inside laminated panes, the connection can however be made by purely mechanical pressing or by molten tinning of the copper strip.

The measurement current path is formed by a region of the electrically conductive coating and runs between the two electrical contact points. It thus acts as an electrical conductor between the contact points, whose electrical resistance is determined, which, in turn, is temperature dependent, and enables the determination of the temperature. The measurement current path can be implemented in the temperature measuring field in different ways. For example, the regions of the temperature measuring field away from the measurement current path can be free of coating. This can be done, for example, by subsequent removal of an originally full-surface conductive coating or by masking techniques at the time of application of the coating. Preferably, however, the measurement current path is formed by insulating lines that are introduced into the electrically conductive coating and guide the electric current along the measurement current path. Except for the insulating lines, the entire temperature measuring field is provided with the electrically conductive coating. It is possible for the entire temperature measuring field suitably patterned by insulating lines to form the measurement current path. It is also possible for a region forming a self-contained convex geometric shape, for example, a rectangle, to be suitably patterned as a whole by insulating lines and form the measurement current path. In a preferred embodiment, the measurement current path is, however, formed only by a region of the coating within the temperature measuring field, which is elongated, in particular, in a linear manner. It is formed by two parallel insulating lines that run between the contact points such that the measurement current path is connected to the contact points. The insulating lines electrically isolate the measurement current path extending between them from the surrounding electrically conductive coating.

The course of the measurement current path can be freely selected by the person skilled in the art according to the requirements in the individual case. It is not subject to any restrictions. In an advantageous embodiment, the measurement current path has a meandering or looplike course. Thus, the longest possible measurement current path can be accommodated in the temperature measuring field in a space-saving manner. However, the measurement current path can, in principle, also be linear and extend, for example, along a side edge of the vehicle pane.

The shorter the measurement current path, the more visually inconspicuous the temperature sensor can be. On the other hand, a longer measurement current path enables a more precise measurement of resistance and temperature. Preferably, the measurement current path has a length of 1 cm to 20 cm auf. The width of the measurement current path is preferably from 0.1 mm to 2 mm.

The electrical contact points can be connected to a voltage source and are intended to be connected to such a voltage source. The contact points are connected to the voltage source via the electrical cables attached to the contact points. The voltage source is arranged outside the vehicle pane and is typically part of the vehicle's on board electrical system. When an electrical voltage is applied to the contact points by means of the voltage source, an electric current flows through the measurement current path between the contact points. Care should be taken to ensure that the voltage applied to the contact points for temperature measurement is not so great that the current flow causes significant heating of the measurement current path and thus distorts the measurement. The power is preferably from 0.5 µW to 3 µW, particularly preferably from 1 µW to 1.5 µW. Particularly good results are thus achieved, and significant distortion due to heating of the measurement current path can be ruled out.

The temperature measurement is based on measuring the current strength of the electric current and determining from it the electrical resistance linked to current strength and voltage according to Ohm's law. Since the electrical resistance is temperature dependent the temperature can be determined from the electrical resistance using suitable calibration data. The calibration data can, for example, be in the form of a calibration table or a mathematical calibration function. The electrical contact points can be connected to an analysis unit and are intended to be connected to such an analysis unit. The analysis unit is suitable for measuring the current strength of the electric current, determining therefrom the electrical resistance of the measurement current path, and determining the temperature from the electrical resistance using the calibration data.

The analysis unit comprises at least a current measuring device (also referred to as an ammeter, colloquially also ampere meter) and a processor for comparing the measured current to the calibration data. The analysis unit typically also includes a memory for storing the calibration data. The analysis unit is typically integrated into the vehicle's on-board electrical or electronic system.

The vehicle pane according to the invention is particularly preferably a windshield, but can also be, for example, a side window, rear window, or roof panel. Windshields are always designed as composite panes; side windows, rear windows, and roof panels can be designed as single pane glass (in particular thermally prestressed ESG) or laminated panes.

In a preferred embodiment, the vehicle pane has a peripheral masking print. Such masking prints are customary for vehicle panes, in particular in the case of windshields, rear windows, and roof panels. The masking print is arranged adjacent the side edge of the vehicle pane, for example, with a width of 5 cm to 20 cm, and surrounds the vehicle pane in a frame-like manner. The masking print is typically formed from an opaque, in particular black enamel, which is applied to one or more pane surfaces by screen printing. The masking print serves primarily to conceal the adhesive bonding of the vehicle pane to the vehicle body and to protect it from UV-radiation. In addition, functional elements, for example, electrical connections or sensors, are often arranged in the region of the masking print to hide them. The region of the surrounding, peripheral masking print is opaque and surrounds the transparent region of the vehicle pane provided for through-vision, which is referred to in the context of the invention as the central through-vision region. The area of the vehicle pane is thus divided into the opaque region of the masking print and the through-vision region. In an advantageous embodiment, the through-vision region has total transmittance of 70%, at least in some areas. The term "total transmittance" refers to the method for testing the light transmittance of motor vehicle windows specified by ECE-R 43, Annex 3, § 9.1. In the case of a windshield, the total transmittance is at least 70%, in particular at least in the so-called field of vision A (vision area A, zone A). The field of vision A and its technical requirements are specified in Regulation No. 43 of the Economic Commission for Europe of the United Nations (UN/ECE) (ECE-R43, "Uniform Provisions concerning the Approval of Safety Glazing Materials and Their Installation on Vehicles"). There, the field of vision A is defined in Annex 18.

The temperature measuring field according to the invention can be arranged completely in the through-vision region or in the opaque region of the masking print. Likewise, it is possible for the temperature measuring field to be arranged partially in the through-vision region and partially in the opaque region of the masking print. In an advantageous embodiment, at least the electrical contact points are arranged in the region of the masking print. This is advantageous in terms of the optical inconspicuousness of the temperature sensor, since the contact points are typically relatively conspicuous and are electrically connected via cables. The contact points together with the contacting are concealed by the masking print.

In a particularly preferred embodiment, the electrical contact points are arranged in the region of the masking print, while most of the measurement current path is arranged in the through-vision region. Thus, the contact points can be hidden while the measurement of the temperature takes place in the through-vision region, where it cannot be distorted by the effects of the masking print. Preferably, at least 80% of the measurement current path, particularly preferably at least 90% of the measurement current path is arranged in the through-vision region. In particular, substantially the entire measurement current path is arranged in the through-vision region with the exception of short connecting sections that lead from the contact points in the direction of the through-vision region.

In one embodiment of the invention, the vehicle pane is implemented as a single pane of glass, in particular as single-pane safety glass, wherein the electrically conductive coating on the interior-side surface of the substrate has at least one electrically conductive layer based on a transparent conductive oxide, in particular based on ITO. This embodiment is suitable in particular for side windows and rear windows.

In another embodiment of the invention, the vehicle pane is implemented as a laminated pane, in particular as laminated safety glass, wherein the substrate is joined to another pane via a thermoplastic intermediate layer, and wherein the electrically conductive coating is arranged on the surface of the substrate facing the intermediate layer and has at least one electrically conductive layer based on a metal, in particular based on silver. This embodiment is suitable in particular for windshields and roof panels but also for laminated side windows and rear windows. The substrate can be the inner pane or the outer pane.

In a particularly preferred embodiment, the vehicle pane is a windshield, in particular the windshield of a passenger car. The electrically conductive coating has no interruptions in the central field of vision A, for example, due to lasered patterning lines. Particularly preferably, the electrically conductive coating also has no such interruptions in the central field of vision B. The temperature measuring field is arranged outside the field of vision A or the field of vision B. The field of vision A and the field of vision B are defined in Regulation No. 43 of the Economic Commission for Europe of the United Nations (UN/ECE) (ECE-R43, "Uniform Provisions concerning the Approval of Safety Glazing Materials and Their Installation on Vehicles"). (cf. in particular Annex 18). Windshields typically have a peripheral masking print. The electrically conductive coating preferably covers the entire through-vision region, except for any interruptions or coating-free regions that serve as communication windows or data transmission windows, and are arranged outside the central field of vision A or B. Particularly preferably, the electrical contact points are arranged in the region of the masking print, while most of the measurement current path is arranged in the through-vision region.

In another particularly preferred embodiment, the electrically conductive coating has no interruptions outside the temperature measuring field. This embodiment is suitable, for example, for side windows.

If the temperature measuring field has further areas of the electrically conductive coating away from the measurement current path, care must, of course, be taken that the electric current used for the measurement flows through the measurement current path and not around the surrounding coating. This can be accomplished by the arrangement of the contact points and the measurement current path, with the measurement current path being the shortest connection between the contact points. For example, the contact points can be arranged in the region of two opposite corners of the temperature measuring field and the measurement current path can extend between them meanderingly. However, it is also optionally possible to electrically isolate the contact points from the surrounding coating. In this case, each contact point is preferably electrically isolated from the surrounding electrically conductive coating, except for the measurement current path, by a coating-free contact separating line. The contact separating line starts at one side of the measurement current path (or at one insulating line delimiting the measurement current path), runs once around the contact point, and ends at the other side of the measurement current path (or at the other insulating line delimiting the measurement current path). Then, the only electrical connection between the contact points is the measurement current path. The embodiment is particularly advisable when the two contact points are arranged relatively close to one another, for example, in order to hide them behind the peripheral masking print at one side edge of the temperature measuring field.

The electrically conductive coating is preferably applied to most of the vehicle pane—in particular at least 80% of the pane surface is provided with the conductive coating. Preferably, the reflective coating is applied to the entire surface of the substrate, with the exception of the separating line according to the invention and any insulating lines and contact separating lines according to the invention. In addition, other regions can be coating-free, in particular an optional circumferential edge region and an optional local region, which are intended as communication, sensor, or camera windows to ensure the transmission of electromagnetic radiation through the windshield. The circumferential uncoated edge region has, for example, a width of up to 20 cm.

In the production of the vehicle pane according to the invention, the entire substrate surface is preferably coated over its entire area, and the coating is subsequently removed again from those regions that are to be coating-free. The removal of the coating is preferably done by laser decoating. Alternatively, the decoating can also be done mechanically by abrasion, in particular in the case of flat, nonlinear regions such as camera windows or a circumferential decoated edge region. Alternatively, it is also possible to exclude the regions from the coating from the outset by masking techniques.

The separating line according to the invention and any insulating lines and contact separating lines according to the invention preferably have line widths of less than 500 µm, particularly preferably from 10 µm to 250 µm, most particularly preferably from 20 µm to 150 µm. As result, effective electrical insulation is achieved and the lines are visually inconspicuous. Said lines are preferably introduced into the conductive coating by laser decoating, which has proven itself for industrial processes because little time is required to decoat thin lines.

In laser decoating, the radiation of a laser is focused on the coating and moved along the line to be decoated. The coating material is removed by the laser radiation. Methods for laser decoating are well-known and can be freely selected by the person skilled in the art according to the requirements in the individual case. The laser radiation is typically focused on the coated surface by means of an optical element such as a lens or an objective and moved over the surface by means of a laser scanner.

The laser radiation can, in principle, have wavelengths in the UV range, the visible range, or the IR range. The wavelength of the laser radiation is preferably from 150 nm to 2500 nm, particularly preferably from 250 nm to 1200 nm. For example, an Nd-YAG laser, which has proven itself for industrial applications, can be used. The Nd:YAG laser can be operated at its fundamental wavelength of 1064 nm or the frequency can be doubled or tripled. However, other lasers can also be used, for example, other solid-state lasers (for example, a titanium-sapphire laser or other doped YAG lasers), fiber lasers, semiconductor lasers, excimer lasers, or gas lasers.

The laser is preferably operated in pulsed mode. This is particularly advantageous in terms of high power density and effective insertion of the insulating lines. Preferably, pulses in the nanosecond or picosecond range are used. The pulse length is preferably less than or equal to 50 ns. The pulse frequency is preferably from 1 kHz to 2000 kHz, particularly preferably from 10 KHz to 1000 kHz. This is particularly advantageous in terms of the power density of the laser during laser decoating.

The output power of the laser radiation is preferably from 0.1 W to 50 W, for example, from 0.3 W to 10 W. The output power required depends in particular on the wavelengths of the laser radiation used and on the degree of absorption of the electrically conductive coating and can be determined by the person skilled in the art by simple experiments.

The laser radiation is preferably moved over the electrically conductive layer at a speed from one 100 mm/s to 10000 mm/s, particularly preferably from 200 mm/s to 5000 mm/s, most particularly preferably from 300 mm/s to 2000 mm/s, for example, from 500 mm/s to 1000 mm/s. This achieves particularly good results.

The invention also includes a vehicle equipped with a vehicle pane according to the invention, a voltage source, and an analysis unit, wherein the electrical contact points are (electrically, in particular galvanically) connected to the voltage source and the analysis unit, wherein an electrical voltage can be applied to the contact points such that an electric current flows through the measurement current path, and wherein the analysis unit is suitable to measure the current strength of the electric current, to determine therefrom the electrical resistance of the measurement current path, and to determine the temperature using calibration data from the electrical resistance. The statements above concerning the vehicle pane apply equally to the vehicle.

The invention also includes a method for producing a vehicle pane according to the invention. The substrate is provided and one of its surfaces is coated over its entirety with the transparent electrically conductive coating. Here, in particular methods of physical vapor deposition are used, particularly preferably magnetron-enhanced cathodic sputtering (magnetron sputtering). However, alternatively, the coating can also be done by chemical vapor deposition or vapor deposition. Optionally, a circumferential edge region can be excluded from the coating or the coating in this edge region can subsequently be removed, for example, mechanically by abrasion. This is, in particular, useful when the coating is susceptible to corrosion and the substrate is to be later joined to another pane via the coated surface to form a laminated pane. As a result of the coating-free edge region, the coating then has no contact with the surrounding atmosphere. A circumferential separating line can be introduced into the coating to isolate the temperature measuring field from the surrounding coating. A measurement current path is formed in the temperature measuring field, preferably by patterning the coating using insulating lines. Electrical contact points are formed at the beginning and end of the measurement current path, preferably by printing and baking a conductive paste containing glass frits and silver particles. The separating line and the insulating lines are preferably introduced by laser decoating, in particular in a common process step. The printing of the contact points can be carried out before or after the laser decoating.

The vehicle pane is typically curved, as is customary in the vehicle sector. The bending of the substrate and the other possible pane preferably takes place after application of the conductive coating and introduction of the insulating lines. Common glass bending methods, such as gravity bending, press bending, and/or suction bending, can be used.

If the vehicle pane is a composite pane, the substrate is preferably laminated to the other pane via a thermoplastic film after bending. The lamination is carried out, for example, by autoclave methods, vacuum bag methods, vacuum ring methods, calender methods, vacuum laminators, or combinations thereof. The panes are usually joined under the action of heat, vacuum, and/or pressure.

The invention also includes a method for measuring the temperature of a vehicle pane according to the invention, wherein an electrical voltage is applied to the electrical contact points such that an electric current flows through the measurement current path, the current strength of the electric current is measured, the electrical resistance of the measurement current path is determined from the current strength, and the temperature is determined from the electrical resistance using calibration data. The statements above concerning the vehicle pane apply equally to the measurement method.

The invention also includes the use of a vehicle pane according to the invention as a window pane of a motor vehicle, in particular as a windshield, side window, rear window, or roof panel. In an advantageous embodiment, the heating of the vehicle pane is controlled as a function of the measured temperature. Thus, at temperatures at which icing, frost, or condensed liquid on the pane are likely, heating of the pane can be initiated, either for a prespecified period of time or up to a target temperature, likewise measured by the temperature sensor, is reached. The threshold temperature below which heating is initiated is stored in the on-board electronic system that controls the automatic heating. The heating of the pane can, for example, be carried out by applying a stream of warm air or by heating elements in the vehicle pane itself. In a particularly preferred embodiment, the electrically conductive coating is electrically contacted outside the temperature measuring field and serves as a heating element that heats up as a result of current flow after application of a voltage. The most uniform introduction of the heating current possible can be done using so-called current bus bars that are arranged along two opposite side edges of the vehicle pane and extend approx. over the entire width of the coating. The current bus bars can be implemented, for example, as printed and baked paste containing glass frits and silver particles or as strips of a metal foil, in particular copper foil. However, the temperature measured can also be used for other purposes, for example, displayed for information purposes for the driver or used as the basis for automatic control of the air conditioning system.

BRIEF DESCRIPTION OF THE DRAWINGS

The invention is explained in detail with reference to drawings and exemplary embodiments. The drawings are a schematic representation and are not to scale. The drawings in no way restrict the invention. They depict.

DETAILED DESCRIPTION

Figure 1:
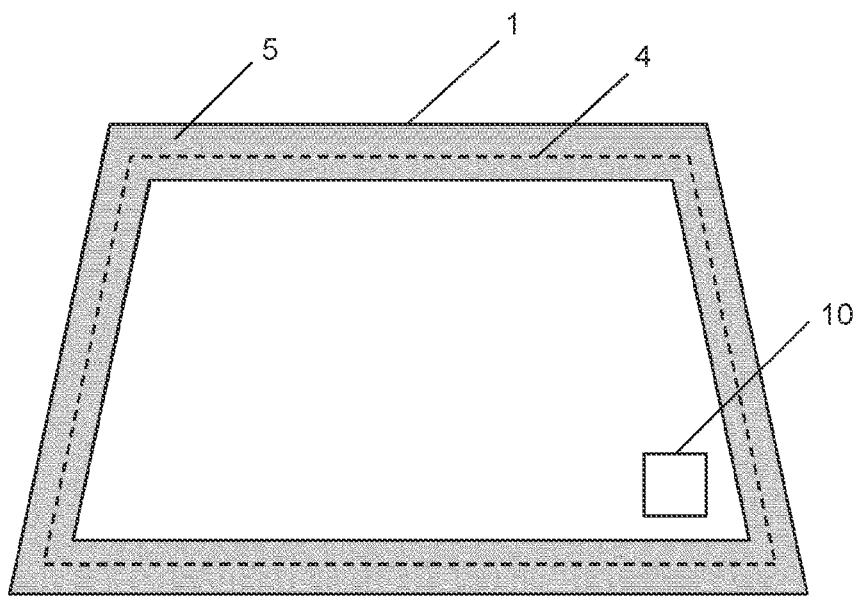
FIG. 1 a plan view of an embodiment of the vehicle pane according to the invention, FIG. 2 a cross-section through the vehicle pane of FIG. 1, FIG. 3 a plan view of an embodiment of the temperature measuring field, FIG. 4 a plan view of another embodiment of the temperature measuring field, FIG. 5 a plan view of another embodiment of the temperature measuring field, FIG. 6 a diagram of the temperature-dependent electrical resistance of an exemplary electrically conductive coating.
Figure 2:
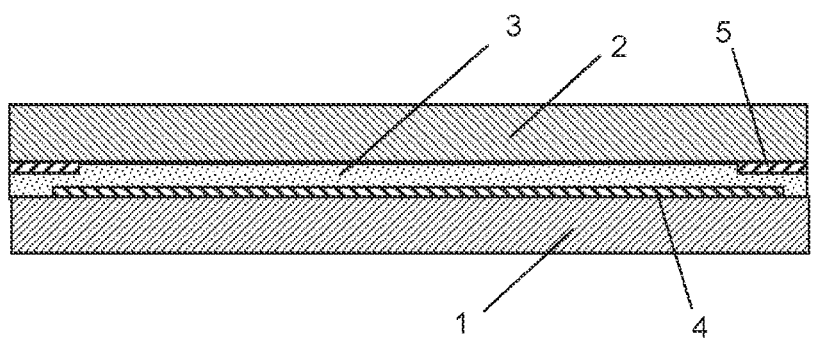

FIG. 1 and FIG. 2 depict in each case a detail of an embodiment of the vehicle pane according to the invention with a temperature sensor. The vehicle pane is the windshield of a passenger car and is implemented as a laminated pane (VSG, laminated safety glass). It comprises a substrate 1 that forms the inner pane of the laminated pane, another pane 2 that forms the outer pane, and a thermoplastic intermediate layer 3 that bonds the inner pane and the outer pane to one another. The substrate 1 is, for example, a glass pane made of soda lime glass with a thickness of 1.6 mm.

The other pane 2 is, for example, a glass pane made of soda lime glass with a thickness of 2.1 mm. The intermediate layer 3 is, for example, made of a plasticizer-containing film of polyvinyl butyral (PVB) with a thickness of 0.76 mm.

The vehicle pane has a peripheral masking print 5 that is formed from a black enamel and printed on the surface of the other pane 2 facing the intermediate layer 3. Due to the masking print 5, a circumferential edge region of the vehicle pane is opaque. The opaque edge region surrounds the transparent central through-vision region of the vehicle pane.

The surface of the substrate 1 facing the intermediate layer 3 is provided with an electrically conductive coating 4. The coating 4 is, for example, a thin layer stack containing multiple electrically conductive layers based on silver in addition to numerous dielectric layers. In a circumferential edge region with a width of, for example, 5 cm, the substrate 1 is not coated. In the interior of the laminated pane, the corrosion-susceptible coating 4 is thus protected against corrosion. The edge of the coating 4 is concealed by the masking print 5.

A temperature measuring field 10 that contains the temperature sensor is formed in the through-vision region. Alternatively, however, the temperature measuring field 10 can also be arranged completely or partially in the opaque edge region of the masking print 5. Possible embodiments of the temperature measuring field 10 are shown in the following figures.

Figure 3:
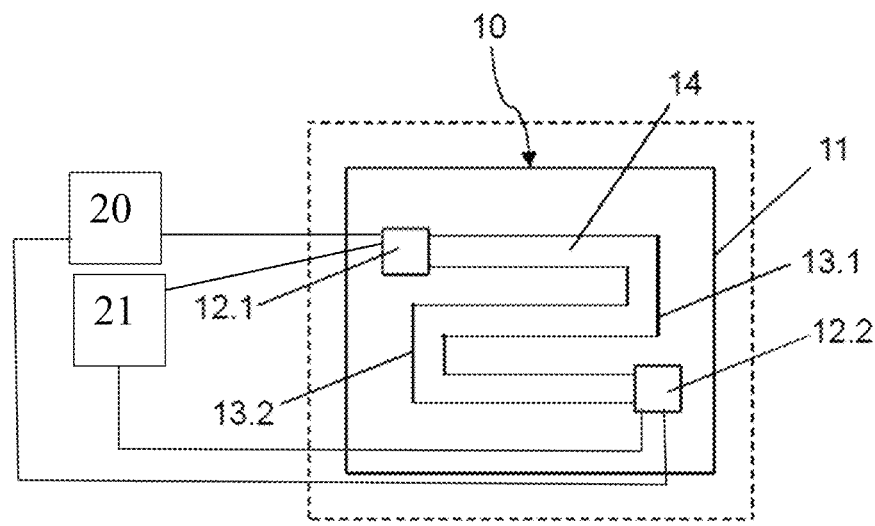

FIG. 3 depicts a first exemplary embodiment of the temperature measuring field 10. It is delimited by a circumferential separating line 11, by which the temperature measuring field 10 (more precisely, the electrically conductive coating 4 within the temperature measuring field 10) is electrically isolated from the surrounding coating 4. In the temperature measuring field 10, the temperature sensor is formed, consisting of two electrical contact points 12.1, 12.2 and a measurement current path 14 running between them. The contact points 12.1, 12.2 are, for example, formed as a square made of a printed and baked conductive paste containing glass frits and silver particles. The measurement current path 14 is formed from a region of the coating 4 that is electrically isolated from the surrounding coating 4 by two parallel insulating lines 13.1, 13.2. The insulating lines 13.1, 13.2 run from the first contact point 12.1 to the second contact point 12.2, with the coating 4 situated between ihnen forming the measurement current path 14. The contact points 12.1, 12.2 are arranged far apart in the region of two opposite corners of the temperature measuring field 10. To save space, the measurement current path 14 runs meanderingly between the contact points 12.1, 12.2.

Soldered to the contact points 12.1, 12.2 are flat conductors (not shown) that extend beyond the side edge of the vehicle pane and enable the connection of the measurement current path 14 to the on-board electronics, in particular to a voltage source 20 and an analysis unit 21. When, by means of the voltage source, an electrical voltage is applied to the contact points 12.1, 12.2, an electric current flows through the measurement current path 14. The current strength is measured by means of the analysis unit and the resistance is determined from this using Ohm's law. The resistance, which is temperature dependent, is compared with calibration data, whereby the current temperature of the vehicle pane can be determined.

Figure 4:
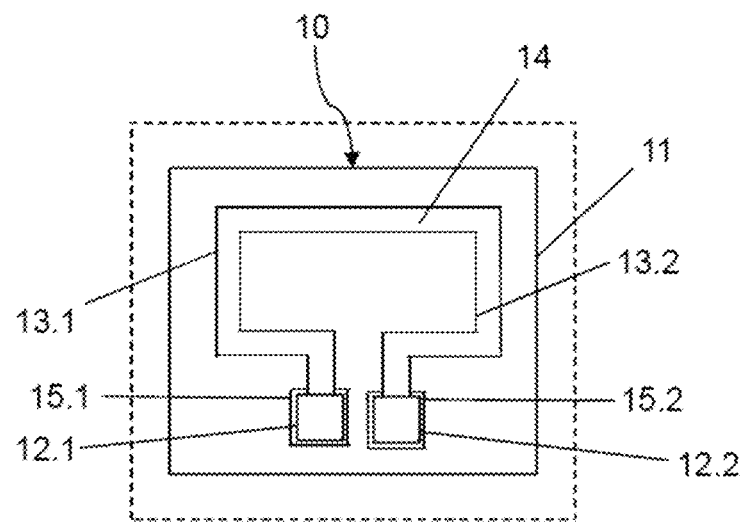

FIG. 4 depicts a second exemplary embodiment of the temperature measuring field 10. It is likewise delimited by a circumferential separating line 11. The two electrical contact points 12.1, 12.2 are arranged adjacent one another in the vicinity of the lower edge of the temperature measuring field. The measurement current path 14 runs in a looplike manner between the contact points 12.1, 12.2. Such a configuration is, in particular, suitable when the contact points 12.1, 12.2 are to be arranged in the opaque edge region of the masking print 5, while the measurement current path 14 is to be arranged predominantly in the through-vision region. Otherwise, the embodiment corresponds to that of FIG. 3.

Since the two contact points 12.1, 12.2 are a short distance apart, the current would not predominantly flow via the measurement current path 14, but, instead, along the direct connecting line between the contact points 12.1, 12.2. To prevent this, each contact point 12.1, 12.2 is electrically isolated from the surrounding electrically conductive coating 4 by a contact separating line 15.1, 15.2. The contact separating line [sic] 15.1, 15.2 run from the first insulating line 13.1 around the respective contact point 12.1, 12.2 to the second insulating line 13.2. The contact points 12.1, 12.2 are thus electrically connected to one another only via the measurement current path 14 such that the electric current is forced to flow via the measurement current path 14.

Figure 5:
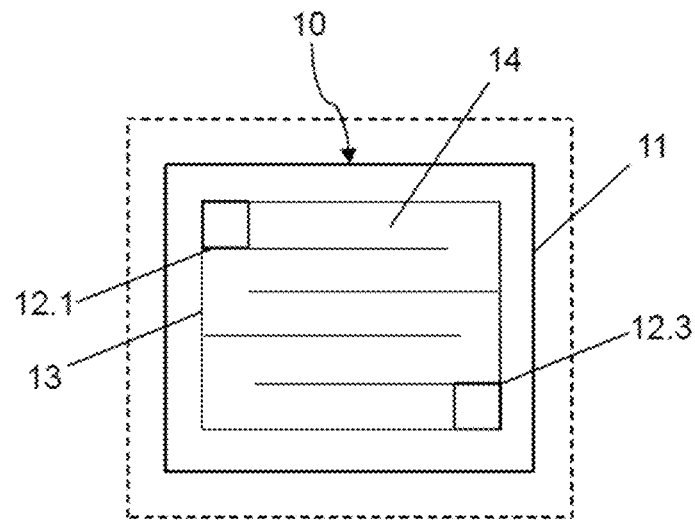

FIG. 5 depicts a third exemplary embodiment of the temperature measuring field 10. It is likewise delimited by a circumferential separating line 11. The embodiment differs from those of FIGS. 3 and 4 in that the measurement current path 14 is not formed by two parallel insulating lines that run between the contact points 12.1, 12.2. Instead, a rectangular region, which is delimited on two opposite corners by the contact points 12.1, 12.2, is patterned by insulating lines 13 such that it forms the measurement current path 14 as a whole. In the embodiment shown, the temperature measuring field 10 is a circumferential coded region that is not part of the measurement current path 14, but, instead, surrounds it in a frame-like manner. However, it would also be possible to use the entire temperature measuring field 10 as a measurement current path 14, if the contact points 12.1, 12.2 are relocated to the corners of the temperature measuring field 10. The design of the measurement current path 14 by insulating lines 13 can be freely selected by the person skilled in the art and is not subject to any restrictions.

Figure 6:
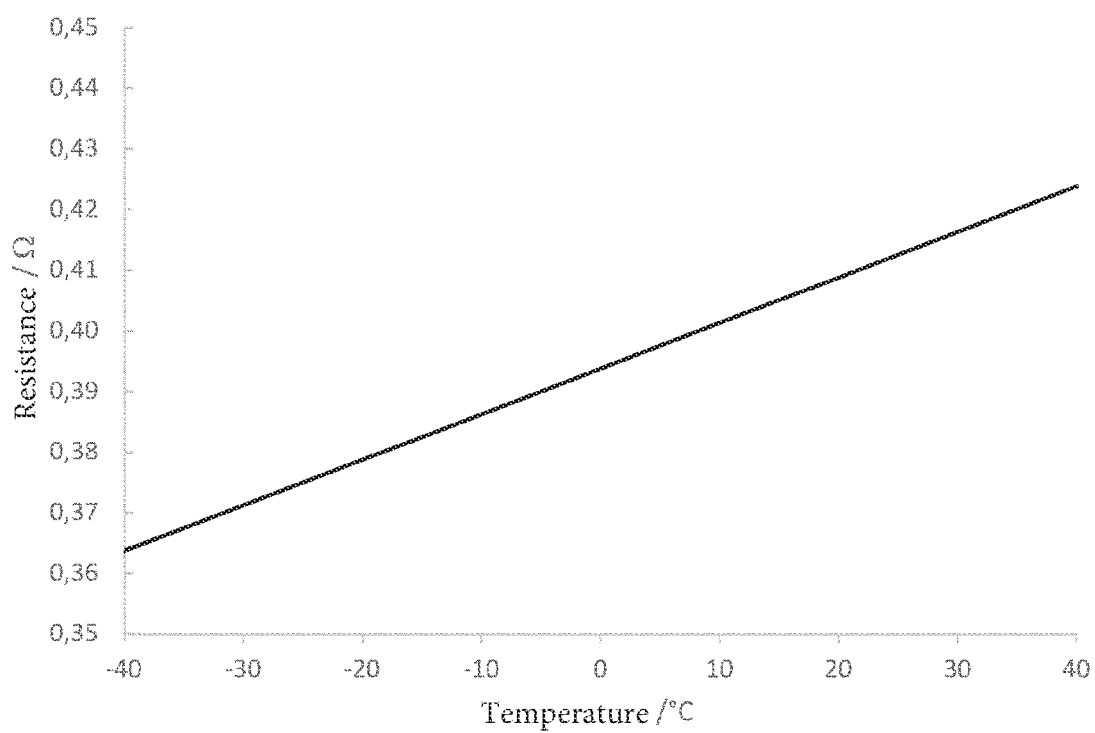

FIG. 6 depicts the temperature dependence of an exemplary electrically conductive coating 4. The coating 4 is a thin layer stack that contains a plurality of electrically conductive silver layers and a plurality of dielectric layers. Such coatings are known per se and are commonly used for windshields as IR protective coatings and/or heatable coatings. The electrical resistance is plotted against the temperature, with an approx. linear dependence discernible. This temperature dependence makes it possible to determine the temperature based on the resistance measured, with the analysis unit using corresponding calibration data.

LIST OF REFERENCE CHARACTERS (1) substrate
(2) other pane
(3) thermoplastic intermediate layer
(4) electrically conductive coating
(5) masking print
(10) temperature measuring field
(11) separating line
(12.1) first electrical contact point
(12.2) second electrical contact point
(13) insulating line
(13.1) first insulating line
(13.2) second insulating line

(14) measurement current path
(15.1) first contact separating line
(15.2) second contact separating line

The invention claimed is:

1. A vehicle pane with a temperature sensor, comprising a substrate and a transparent electrically conductive coating on a surface of the substrate, wherein
   a temperature measuring field that is electrically isolated from the surrounding transparent electrically conductive coating by a separating line is formed in the transparent electrically conductive coating,
   a measurement current path running between two electrical contact points is formed from a region of the transparent electrically conductive coating in the temperature measuring field,
   the two electrical contact points is are connectable to a voltage source such that an electric current flows through the measurement current path,
   the two electrical contact points are connectable to an analysis unit that is adapted to measure a current strength of the electric current, determine an electrical resistance of the measurement current path therefrom, and determine a temperature from the electrical resistance using calibration data, and
   the vehicle pane further comprises a peripheral masking print that surrounds a central through-vision region, wherein the two electrical contact points are arranged in a region of the masking print.

2. The vehicle pane according to claim 1, wherein most of the measurement current path is arranged in the through-vision region.

3. The vehicle pane according to claim 1, wherein the measurement current path has a length of 1 cm to 20 cm.

4. The vehicle pane according to claim 1, which is implemented as single-pane safety glass, wherein the transparent electrically conductive coating is arranged on an interior-side surface of the substrate and has at least one electrically conductive layer based on a transparent conductive oxide.

5. The vehicle pane according to claim 1, which is implemented as laminated safety glass, wherein the substrate is joined to another pane via a thermoplastic intermediate layer, and wherein the transparent electrically conductive coating is arranged on the surface of the substrate facing the thermoplastic intermediate layer and has at least one electrically conductive layer based on silver.

6. The vehicle pane according to claim 1, wherein each contact point of the two electrical contact points is electrically isolated from the surrounding transparent electrically conductive coating by a contact separating line, apart from the measurement current path.

7. The vehicle pane according to claim 1, wherein the measurement current path runs meanderingly or in a loop-like manner between the two electrical contact points.

8. The vehicle pane according to claim 1, wherein the temperature measuring field has a size of at most 5 cm$^2$.

9. The vehicle pane according to claim 8, wherein the temperature measuring field has a size from 0.5 cm$^2$ to 2 cm$^2$.

10. A method for measuring the temperature of a vehicle pane according to claim 1, comprising:
    applying an electrical voltage using the voltage source to the two electrical contact points such that the electric current flows through the measurement current path,
    measuring the current strength of the electric current,
    determining the electrical resistance of the measurement current path from the current strength, and
    determining the temperature from the electrical resistance using the calibration data.

11. A vehicle, equipped with a vehicle pane according to claim 1, the voltage source, and the analysis unit, wherein the two electrical contact points are connected to the voltage source and to the analysis unit, wherein the voltage source is adapted to apply an electrical voltage to the two electrical contact points such that the electric current flows through the measurement current path, and wherein the analysis unit is adapted to measure the current strength of the electric current, determine the electrical resistance of the measurement current path therefrom, and determine the temperature from the electrical resistance using calibration data.

12. The vehicle according to claim 11, wherein the analysis unit comprises a current measuring device and a processor for comparing the measured current strength with the calibration data.

13. A method comprising providing a vehicle pane according to claim 1 as a window pane of a motor vehicle, wherein heating of the vehicle pane is controlled as a function of the determined temperature.

14. The method according to claim 13, wherein the window pane is a windshield, a side window, a rear window, or a roof panel.

15. A vehicle pane with a temperature sensor, comprising a substrate and a transparent electrically conductive coating on a surface of the substrate,
    wherein
       a temperature measuring field that is electrically isolated from the surrounding transparent electrically conductive coating by a separating line is formed in the transparent electrically conductive coating,
       a measurement current path running between two electrical contact points is formed from a region of the transparent electrically conductive coating in the temperature measuring field,
       the two electrical contact points are connectable to a voltage source such that an electric current flows through the measurement current path,
       the two electrical contact points are connectable to an analysis unit that is adapted to measure a current strength of the electric current, determine an electrical resistance of the measurement current path therefrom, and determine a temperature from the electrical resistance using calibration data, and
    the measurement current path is formed by two parallel insulating lines running between the two electrical contact points, which two parallel insulating lines electrically isolate the measurement current path from the surrounding transparent electrically conductive coating.

16. The vehicle pane according to claim 15, wherein most of the measurement current path is arranged in the through-vision region.

17. The vehicle pane according to claim 15, wherein the measurement current path has a length of 1 cm to 20 cm.

18. A vehicle pane with a temperature sensor, comprising a substrate and a transparent electrically conductive coating on a surface of the substrate,
    wherein
       a temperature measuring field that is electrically isolated from the surrounding transparent electrically conductive coating by a separating line is formed in the transparent electrically conductive coating,
       a measurement current path running between two electrical contact points is formed from a region of the transparent electrically conductive coating in the temperature measuring field, the two electrical contact points are connectable to a voltage source such that an electric current flows through the measurement current path, the two electrical contact points are connectable to an analysis unit that is adapted to measure a current strength of the electric current, determine an electrical resistance of the measurement current path therefrom, and determine a temperature from the electrical resistance using calibration data, and the two electrical contact points are implemented as printed and baked electrically conductive paste containing glass frits and silver particles.

19. The vehicle pane according to claim 18, wherein most of the measurement current path is arranged in the through-vision region.

20. The vehicle pane according to claim 18, wherein the measurement current path has a length of 1 cm to 20 cm.

* * * * *